(12) United States Patent
Klees et al.

(10) Patent No.: US 7,406,865 B2
(45) Date of Patent: Aug. 5, 2008

(54) LEVEL MEASUREMENT ARRANGEMENT

(75) Inventors: Dan Klees, Greenwood, IN (US); Rob Vermeulen, Greenwood, IN (US); Lewis Bryant, Edinburgh, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 44 days.

(21) Appl. No.: 11/107,855

(22) Filed: Apr. 18, 2005

(65) Prior Publication Data

US 2006/0230827 A1   Oct. 19, 2006

(51) Int. Cl.
*G01F 23/24* (2006.01)

(52) U.S. Cl. .................................... 73/304 R

(58) Field of Classification Search ............. 73/304 R
See application file for complete search history.

(56) References Cited

U.S. PATENT DOCUMENTS 3,975,582 A * 8/1976 Ford ..................... 174/153 R
4,465,088 A * 8/1984 Vosper ....................... 137/1

* cited by examiner

*Primary Examiner*—Hezron E. Williams
*Assistant Examiner*—Paul M West
(74) *Attorney, Agent, or Firm*—Bacon & Thomas, PLLC

(57) ABSTRACT

A level measurement arrangement for measurement of a level of a product in a container comprising: a level sensor, comprising: a conductive probe, a mounting element, comprising, and a process connector, for mounting the mounting element on a ferrule on the container, is described, wherein electrical isolation of the conductive probe from the ferrule is ensured via a dielectric insert, which is inserted in the ferrule, fills all cavities inside the ferrule, and extends through the ferrule into the container.

9 Claims, 2 Drawing Sheets

LEVEL MEASUREMENT ARRANGEMENT

TECHNICAL FIELD

The present invention relates to a level measurement arrangement for the measurement of a level of a product in a container.

BACKGROUND OF THE INVENTION

Level measurement forms a central part in many industrial applications. Level measurement data is for example used for industrial process control and/or automation. Various level measurement devices are presently available on the market.

There are level measurement devices on the market, applying time of flight radar techniques to determine the position of the surface of a product in a container. Corresponding level measurement devices comprise a conductive probe that extends into the container. The probe is connected to sensor electronics comprising means for generating and sending short electromagnetic pulses down the probe and means for reception of echoes of the pulses reflected at a surface of the product. The level of the product is determined based on a measurement of a time of flight needed for a pulse to travel down the probe and its echo to return. Such devices are for example the Guided Radar Transmitters Levelflex FMP 40, sold by the applicant, or devices as they are for example described in US-A6,690,320 or DE-A1 100 19 129.

In typical measurement arrangements, a level sensor comprising the conductive probe has a mounting element including a process connector, for mounting the mounting element on a mating ferrule on the container. The conductive probe is isolated from the process connector and the mating ferrule by an electric insulator inside the mounting element and/or the process connector, e.g. by an insulated feed through inside the process connector. A frequently used insulating material is for example polytetrafluorethylen (PTFE). The mating ferrule often comprises a tubular stud or hollow cylinder, enclosing an opening of the container, and a process connector, e.g. a flange, a threaded coupling or a tri-clamp connector, onto which the level sensor is mounted via its process connector. The conductive probe extends through the mating ferrule into the container. Typically a cavity exists between the conductive probe and the sections of the ferrule below its process connector.

The cavity is open to the container. Consequently, there is a possibility, that a product inside the container can enter the cavity. For example, if liquids and powders are mixed inside the container, the materials can be splashed into the cavity. Conductive products entering the cavity can form a conductive path between the conductive probe and the ferrule, which can seriously affect transmission of electromagnetic signals, in particular surface waves, up and down the probe or in the worst case make it impossible. Because of deposits in the vicinity of the probe and the ferrule, undesired reflections, signal attenuation and/or noise may occur. A short circuit in this region renders signal transmission impossible. Quite often, the ferrule and the process connector of the mounting element are connected via metal parts, which form an electrically conductive connection between the process connector and the ferrule. A short circuit between the probe and the ferrule would then short circuit the probe and the process connector of the mounting element.

SUMMARY OF THE INVENTION

It is an object of the invention to provide a level measurement arrangement as described above, wherein electrical isolation of the conductive probe from the ferrule is endured.

To this extent the invention comprises a level measurement arrangement for measurement of a level of a product in a container, comprising:
  a level sensor, comprising:
    a conductive probe,
    a mounting element, comprising
      a process connector, for mounting the mounting element on a ferrule on the container, and
    a dielectric insert,
      inserted in the ferrule,
      filling all cavities inside the ferrule, and
      extending through the ferrule into the container, wherein the conductive probe extends from the mounting element through the dielectric insert into the container.

According to a preferred embodiment, the dielectric insert has an insertion length, which is greater than an insertion length of the ferrule.

According to a preferred embodiment, the dielectric insert extends into the container, past an end of the ferrule facing into the container.

According to a preferred embodiment, the dielectric insert comprises a conical tip, which surrounds the conductive probe and points into the container.

According to a refinement of the invention, the dielectric insert comprises an outer thread and is threaded into the ferrule.

According to a further refinement of the refinement, the process connection of the mounting element is a threaded coupling, and the dielectric insert comprises an inner thread, such that the mounting element can be screwed onto the dielectric insert.

According to another refinement, the dielectric insert comprises an outer rim, which is clamped between the process connector of the mounting element and a mating counter connector on the ferrule.

According to a preferred embodiment, the level sensor comprises
  a sensor electronic comprising
    means for generating and sending short electromagnetic pulses down the conductive probe,
    means for reception of echoes of the pulses reflected at a surface of the product,
    means for determining the level of the product in the container, based on a time of flight needed for a pulse to travel down the conductive probe and its echo to return.

It is an advantage of the arrangement according to the invention, that the dielectric insert fills all inner cavities inside the ferrule an thus prevents any material from entering the ferrule, which might form a conductive path between the conductive probe and the ferrule or the process connector of the sensor element respectively.

The invention and its advantages are explained in more detail using the figures of the drawing, in which one exemplary embodiment is shown. The same reference numerals refer to the same elements throughout the figures.

DETAILED DESCRIPTION OF THE DRAWINGS

Figure 1:
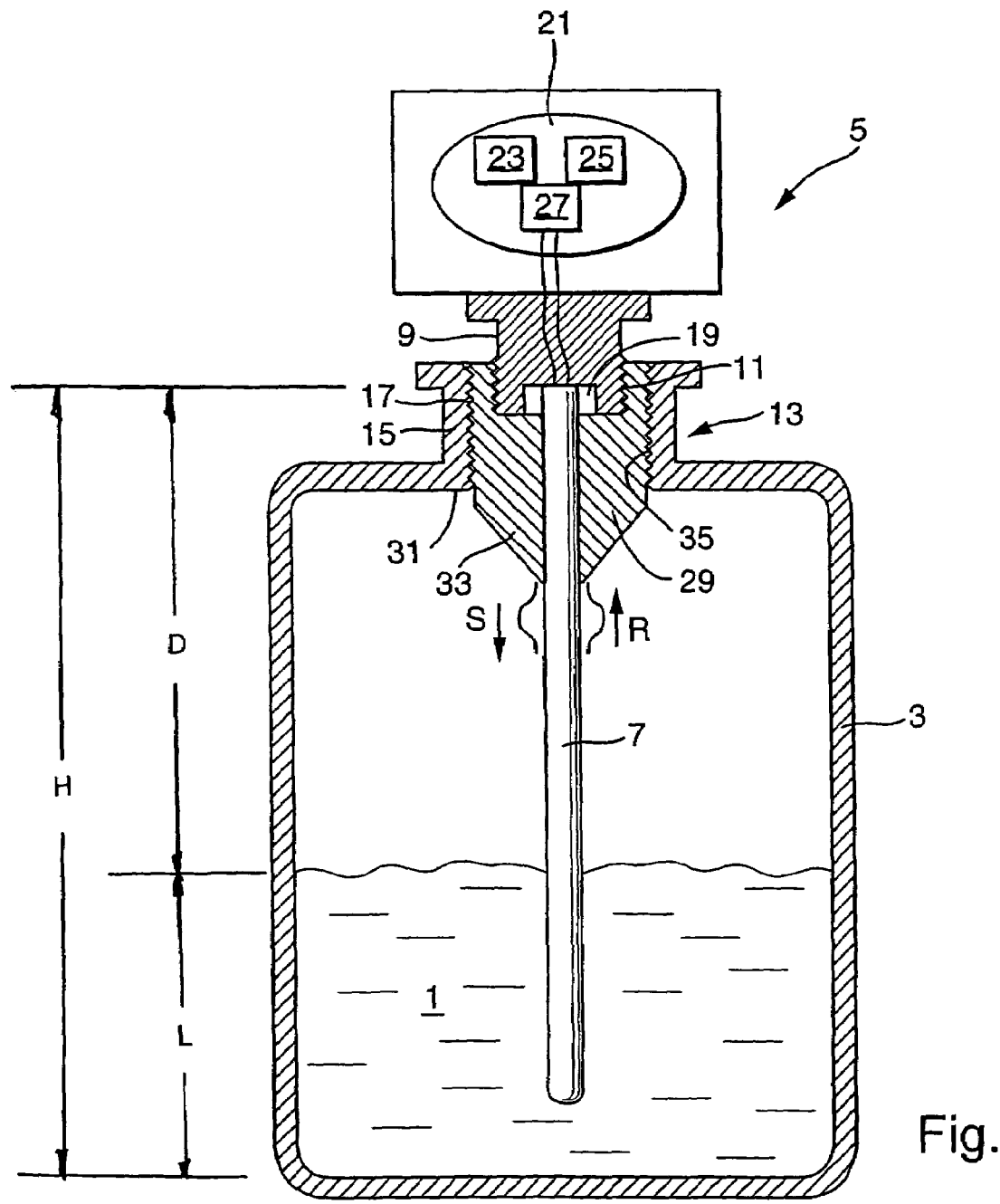
FIG. 1 shows a schematic diagram of a level measurement arrangement using threaded couplings for mounting the sensor element.

FIG. 1 shows a schematic diagram of a level measurement arrangement for measurement of a level of a product 1 in a container 3. The container 3 can be any type of vessel or tank used in industry.

Central part of the arrangement is a level sensor 5. The level sensor 5 comprises a conductive probe 7 and a mounting element 9 comprising a process connector 11, here an outer thread formed on an outside surface of the mounting element 9, for mounting the level sensor 5 on a mating ferrule 13 on the container 3. The ferrule 13 comprises a tubular stud 15, enclosing an opening of the container 3, and a process connector 17. In the embodiment shown in FIG. 1, the process connector 17 is an inner thread on an inner cylindrical surface of the tubular stud 15. Inside the mounting element 9 an insulated feedthrough 19 is foreseen, for electrically connecting the conductive probe 7 to a sensor electronic 21.

The sensor electronic 21 comprises means 23 for generating and sending short electromagnetic pulses S down the probe 7, means 25 for reception of echoes E of the pulses S reflected at a surface of the product 1 and means 27 for determining the level of the product 1 in the container 3, based on a time of flight t needed for a pulse S to travel down the probe 7 and its echo E to return. Developments by the National Laboratory System now make it possible to generate fast, low power pulses, and time their return with very inexpensive circuits. See, for example, U.S. Pat. No. 5,345,471 and U.S. Pat. No. 5,361,070 assigned to The Regent of the University of California. The pulses generated by this new technology are broadband, and are not square wave pulses. In addition, the generated pulses have a very low power level. Such pulses are at a frequency of 100 MHz or higher and have an average power level of about 1 nano Watt or lower. Typical emission rates are for example several MHz.

The pulses S are supplied to the probe 7 via a coupling located inside the mounting element 9. They propagate down the probe 7, are reflected at the product surface and return to the coupling. The time of flight needed is determined. It is proportional to the distance D between the coupling and the surface of the product 1. Given a velocity v of propagation of the pulse along the probe 7 and a distance H between the coupling and a bottom of the container 3, the level L equals:

$$L = H - \tfrac{1}{2}(vt).$$

In order to ensure electrical isolation of the conductive probe 7 from the ferrule 13, a dielectric insert 29 is inserted in the ferrule 13. The dielectric insert 29 is made out of an insulating material, preferably out of polytetrafluorethylen (PTFE). The insert 29 fills all cavities existing inside the ferrule 13 and extends through the ferrule 13 into the container 3. Preferably, the dielectric insert 29 has an insertion length, which is greater than an insertion length of the ferrule 13 and extends into the container 3, past an end 31 of the ferrule 13 facing into the container 3.

The conductive probe 7 extends from the mounting element 9 through the dielectric insert 29 into the container 3. In the embodiment shown in FIG. 1, the dielectric insert 29 comprises a conical tip 33, which surrounds the conductive probe 7 and points into the container 3. This has the advantage, that any product 1, which might come in contact with the insert 29, is guided down the conical surface of the tip 33 away from the ferrule 13.

In the embodiment shown in FIG. 1, the dielectric insert 29 comprises an outer thread 35 and is threaded into the mating process connector 17 of the ferrule 13. The process connector 11 of the mounting element 9 is a threaded coupling, comprising an outer thread, which is screwed into a cylindrical recess in the dielectric insert 29 facing away from the container 2. To this extend, the dielectric insert 29 comprises an inner thread, such that the mounting element 9 can be screwed onto the dielectric insert 29. In the embodiment shown in FIG. 1, the level sensor 5 is mounted on the ferrule via the dielectric insert 29.

Figure 2:
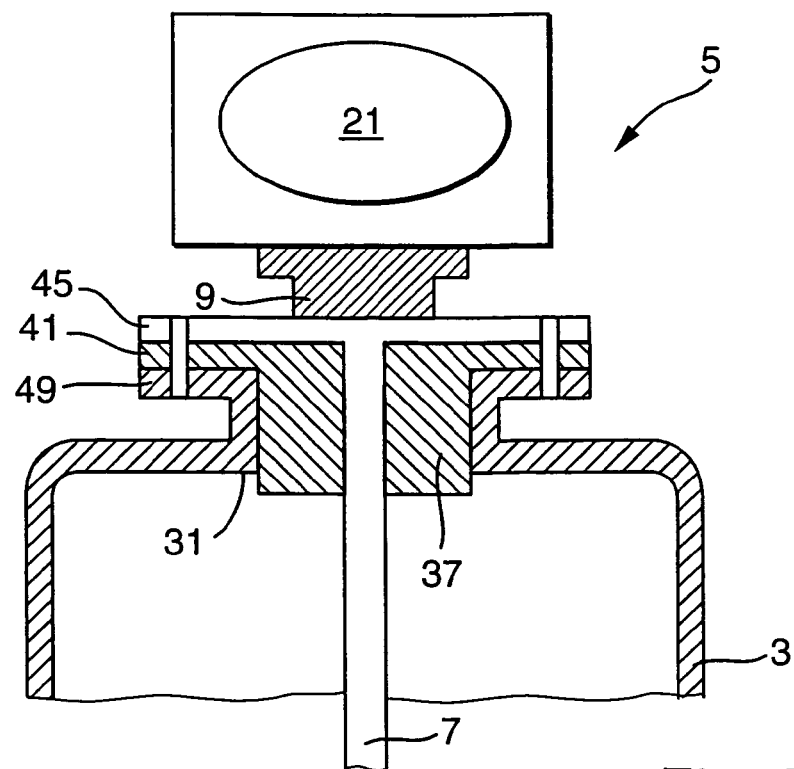
FIG. 2 shows a schematic diagram of a level measurement arrangement using flanges for mounting the sensor element.
Figure 3:
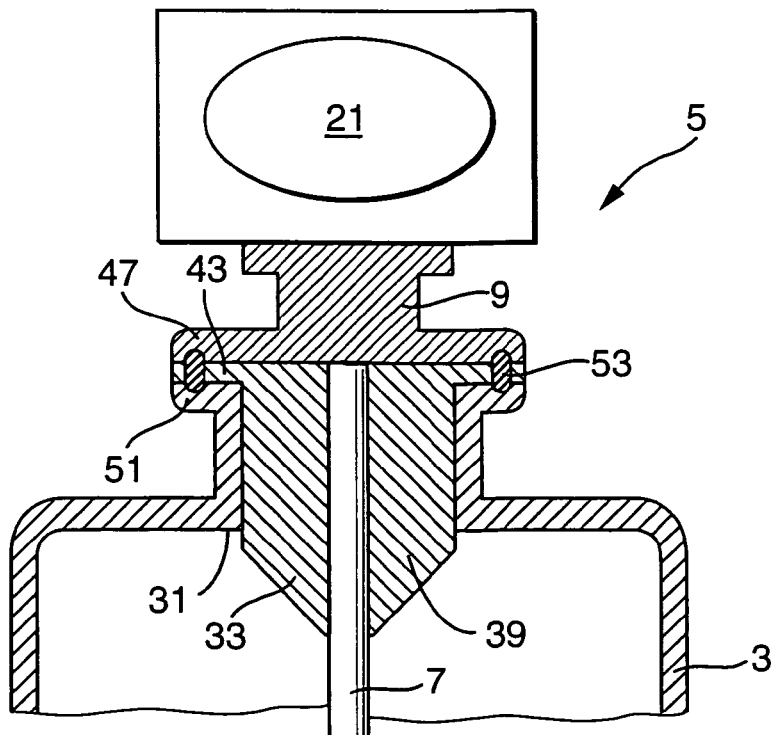
FIG. 3 shows a schematic diagram of a level measurement arrangement using tri-clamp connectors for mounting the sensor element.

FIGS. 2 and 3 show further embodiments of level measurement arrangements according to the invention. Because of the great resemblance to the previously described embodiment, only the existing differences are described.

The main difference is, that the dielectric inserts 37, 39 shown in FIGS. 2 and 3 comprise an outer rim 41, 43, which is clamped between the process connector 45, 47 of the mounting section 9 and a mating counter connector 49, 51 on the ferrule 13.

In the embodiment shown in FIG. 2, the dielectric insert 37 comprises a cylinder, which fills all cavities inside the ferrule 13 and the rim 41. The rim 41 extends radially outward at an end of the cylinder facing away from the container 3. The process connector 45 of the mounting section 9 and the mating counter connector 49 on the ferrule 13 are flanges, having opposing flat surfaces, between which the rim 41 is clamped.

In the embodiment shown in FIG. 3, the dielectric insert 39 comprises a cylinder, which fills all cavities inside the ferrule 13, the rim 43 and a conical tip 33. The rim 43 extends radially outward at an end of the cylinder facing away from the container 3. The process connector 47 of the mounting section 9 and the mating counter connector 51 on the ferrule 13 are tri-clamp connectors, having opposing flat surfaces, between which the rim 43 is clamped. An annular seal or gasket 53 is provided between the opposing tri-clamp connectors.

The invention is not limited to the specific types of process connectors for mounting the level sensor 5 on the ferrule 13 or for holding the dielectric insert inside the ferrule, shown. Other types of connectors can be applied.

The dielectric inserts 29, 37, 39 according to the invention fill all cavities inside the ferrule 13, which are open to the interior of the container. Consequently no product 1 can enter and thereby form a conductive bridge between the conductive probe 7 and the ferrule 13 or the process connector 11, 45, 47 respectively. Consequently, electric isolation of the conductive probe 7 is ensured.

What is claimed is:

1. A level measurement arrangement for measurement of a level of a product in a container based on the time of flight needed for electromagnetic pulses to travel down a probe to a surface of the product and its echo to return, comprising:

a ferrule comprising a tubular stud enclosing an opening of the container, extending from the container and defining a process connector;

a level sensor, comprising: a conductive probe, and a mounting element; and a dielectric insert, inserted in the ferrule, filling all cavities inside the ferrule, and extending through the ferrule into the container, wherein:

said mounting element being mounted to said ferrule by said process connector;

said conductive probe extends from said mounting element through said dielectric insert into the container; and said dielectric insert being so mounted to thereby insure electrical insulation between said conductive probe and said ferrule.

2. The level measurement arrangement according to claim 1, wherein:
said dielectric insert has an insertion length, which is greater than an insertion length of said ferrule.

3. The level measurement arrangement according to claim 1, wherein:
said dielectric insert extends into the container, past an end of the ferrule facing into the container.

4. The level measurement arrangement according to claim 1, wherein:
the dielectric insert comprises a conical tip, which surrounds said conductive probe and points into the container.

5. The level measurement arrangement according to claim 1, wherein:
said dielectric insert includes an outer thread used for threading said dielectric insert into said ferrule.

6. The level measurement arrangement according to claim 1, wherein:
said process connector is a threaded coupling; and
said dielectric insert includes an inner thread, such that said mounting element can be screwed onto said dielectric insert.

7. The level measurement arrangement according to claim 1, wherein:
said dielectric insert comprises an outer rim, which is clamped between said process connector of said mounting element and a mating counter connector on said ferrule.

8. The level measurement arrangement according to claim 1, wherein:
said level sensor further comprises a sensor electronic comprising:
means for generating and sending short electromagnetic pulses (S) down the conductive probe;
means for reception of echoes (E) of the pulses (S) reflected at a surface of the product; and
means for determining the level of the product in the container, based on a time of flight (t) needed for a pulse (S) to travel down said conductive probe, and its echo (E) to return.

9. The level measurement arrangement according to claim 1, wherein:
said level sensor comprises a further process connector, for mounting said mounting element to said dielectric insert.

* * * * *